(12) United States Patent
Xu et al.

(10) Patent No.: US 11,877,066 B2
(45) Date of Patent: Jan. 16, 2024

(54) ADAPTIVE ILLUMINATION FOR A TIME-OF-FLIGHT CAMERA ON A VEHICLE

(71) Applicant: TUSIMPLE, INC., San Diego, CA (US)

(72) Inventors: Ke Xu, San Diego, CA (US); Xue Mei, San Diego, CA (US); Zehua Huang, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 0 days.

(21) Appl. No.: 17/986,744

(22) Filed: Nov. 14, 2022

(65) Prior Publication Data

US 2023/0074491 A1 Mar. 9, 2023

Related U.S. Application Data

(63) Continuation of application No. 17/325,135, filed on May 19, 2021, now Pat. No. 11,523,067, which is a
(Continued)

(51) Int. Cl.
*H04N 23/73* (2023.01)
*G05D 1/00* (2006.01)
(Continued)

(52) U.S. Cl.
CPC ............. *H04N 23/73* (2023.01); *B60R 11/04* (2013.01); *G05D 1/0088* (2013.01);
(Continued)

(58) Field of Classification Search
CPC ....................................................... H04N 23/73
(Continued)

(56) References Cited

U.S. PATENT DOCUMENTS 6,975,923 B2 12/2005 Spriggs
7,742,841 B2 6/2010 Sakai et al.
(Continued)

FOREIGN PATENT DOCUMENTS

CN 102590821 A 7/2012
CN 104363380 A 2/2015
(Continued)

OTHER PUBLICATIONS

U.S. Appl. No. 16/250,823 Non-Final Office Action dated Nov. 27, 2020, pp. 1-8.
(Continued)

*Primary Examiner* — Joel W Fosselman
(74) *Attorney, Agent, or Firm* — Perkins Coie LLP; Paul Liu

(57) ABSTRACT

Disclosed are devices, systems and methods for capturing an image. In one aspect an electronic camera apparatus includes an image sensor with a plurality of pixel regions. The apparatus further includes an exposure controller. The exposure controller determines, for each of the plurality of pixel regions, a corresponding exposure duration and a corresponding exposure start time. Each pixel region begins to integrate incident light starting at the corresponding exposure start time and continues to integrate light for the corresponding exposure duration. In some example embodiments, at least two of the corresponding exposure durations or at least two of the corresponding exposure start times are different in the image.

18 Claims, 4 Drawing Sheets

Related U.S. Application Data continuation of application No. 16/127,022, filed on Sep. 10, 2018, now Pat. No. 11,019,274.

(51) Int. Cl.
    *G05D 1/02* (2020.01)
    *B60R 11/04* (2006.01)
    *H04N 25/534* (2023.01)

(52) U.S. Cl.
    CPC ......... *G05D 1/0246* (2013.01); *H04N 25/534* (2023.01); *G05D 2201/0213* (2013.01)

(58) Field of Classification Search
    USPC .......................................................... 701/36
    See application file for complete search history.

(56) References Cited

U.S. PATENT DOCUMENTS

| | | | |
|---|---|---|---|
| 8,346,480 B2 | 1/2013 | Trepagnier et al. | |
| 8,706,394 B2 | 4/2014 | Trepagnier et al. | |
| 8,718,861 B1 | 5/2014 | Montemerlo et al. | |
| 8,983,708 B2 | 3/2015 | Choe et al. | |
| 9,088,744 B2 | 7/2015 | Grauer et al. | |
| 9,214,084 B2 | 12/2015 | Grauer et al. | |
| 9,219,873 B2 | 12/2015 | Grauer et al. | |
| 9,282,144 B2 | 3/2016 | Tebay et al. | |
| 9,317,033 B2 | 4/2016 | Ibanez-guzman et al. | |
| 9,347,779 B1 | 5/2016 | Lynch | |
| 9,418,549 B2 | 8/2016 | Kang et al. | |
| 9,494,935 B2 | 11/2016 | Okumura et al. | |
| 9,507,346 B1 | 11/2016 | Levinson et al. | |
| 9,513,634 B2 | 12/2016 | Pack et al. | |
| 9,538,113 B2 | 1/2017 | Grauer et al. | |
| 9,547,985 B2 | 1/2017 | Tuukkanen | |
| 9,549,158 B2 | 1/2017 | Grauer et al. | |
| 9,599,712 B2 | 3/2017 | Van Der Tempel et al. | |
| 9,600,889 B2 | 3/2017 | Boisson et al. | |
| 9,602,807 B2 | 3/2017 | Crane et al. | |
| 9,620,010 B2 | 4/2017 | Grauer et al. | |
| 9,625,569 B2 | 4/2017 | Lange | |
| 9,628,565 B2 | 4/2017 | Stenneth et al. | |
| 9,649,999 B1 | 5/2017 | Amireddy et al. | |
| 9,690,290 B2 | 6/2017 | Prokhorov | |
| 9,701,023 B2 | 7/2017 | Zhang et al. | |
| 9,712,754 B2 | 7/2017 | Grauer et al. | |
| 9,723,233 B2 | 8/2017 | Grauer et al. | |
| 9,726,754 B2 | 8/2017 | Massanell et al. | |
| 9,729,860 B2 | 8/2017 | Cohen et al. | |
| 9,739,609 B1 | 8/2017 | Lewis | |
| 9,753,128 B2 | 9/2017 | Schweizer et al. | |
| 9,753,141 B2 | 9/2017 | Grauer et al. | |
| 9,754,490 B2 | 9/2017 | Kentley et al. | |
| 9,760,837 B1 | 9/2017 | Nowozin et al. | |
| 9,766,625 B2 | 9/2017 | Boroditsky et al. | |
| 9,769,456 B2 | 9/2017 | You et al. | |
| 9,773,155 B2 | 9/2017 | Shotton et al. | |
| 9,779,276 B2 | 10/2017 | Todeschini et al. | |
| 9,785,149 B2 | 10/2017 | Wang et al. | |
| 9,805,294 B2 | 10/2017 | Liu et al. | |
| 9,810,785 B2 | 11/2017 | Grauer et al. | |
| 9,823,339 B2 | 11/2017 | Cohen | |
| 10,009,554 B1 | 6/2018 | Miao | |
| 2006/0202038 A1 | 9/2006 | Wang et al. | |
| 2008/0174685 A1 | 7/2008 | Shan | |
| 2010/0265346 A1 | 10/2010 | Iizuka | |
| 2011/0247031 A1 | 10/2011 | Jacoby | |
| 2012/0281133 A1 | 11/2012 | Kurita | |
| 2013/0057740 A1* | 3/2013 | Takaiwa | H04N 25/704 348/297 |
| 2016/0094797 A1 | 5/2016 | Yoon et al. | |
| 2016/0259057 A1 | 9/2016 | Ito | |
| 2016/0334230 A1 | 11/2016 | Ross et al. | |
| 2016/0344965 A1 | 11/2016 | Grauer et al. | |
| 2017/0187970 A1* | 6/2017 | Zhou | H04N 25/583 |
| 2018/0091630 A1 | 3/2018 | Yeung et al. | |
| 2018/0188060 A1 | 7/2018 | Wheeler et al. | |
| 2018/0202822 A1 | 7/2018 | DeLizio et al. | |
| 2018/0203122 A1 | 7/2018 | Grauer | |
| 2018/0284224 A1 | 10/2018 | Weed | |
| 2019/0037120 A1 | 1/2019 | Ohki | |
| 2019/0064800 A1 | 2/2019 | Frazzoli | |
| 2019/0179025 A1 | 6/2019 | England et al. | |
| 2019/0187716 A1 | 6/2019 | Cantrell et al. | |
| 2019/0204423 A1 | 7/2019 | O'Keeffe | |
| 2019/0230303 A1 | 7/2019 | Wang et al. | |
| 2019/0373188 A1* | 12/2019 | Takahashi | H04N 25/533 |
| 2020/0084361 A1 | 3/2020 | Xu et al. | |
| 2020/0174469 A1 | 6/2020 | Trumpore et al. | |

FOREIGN PATENT DOCUMENTS

| | | |
|---|---|---|
| CN | 204314826 U | 5/2015 |
| CN | 205230349 U | 5/2016 |
| CN | 106826833 A | 6/2017 |
| CN | 107229625 A | 10/2017 |
| CN | 107743590 A | 2/2018 |
| CN | 108353140 A | 7/2018 |
| JP | 2010070127 A | 4/2010 |
| KR | 100802511 B1 | 2/2008 |
| KR | 100917012 B1 | 9/2009 |
| WO | 2014166245 A1 | 10/2014 |
| WO | 2017009848 A1 | 1/2017 |
| WO | 2017089596 A1 | 6/2017 |
| WO | 2017183480 A1 | 10/2017 |
| WO | 2019114220 A1 | 6/2019 |
| WO | 2020055833 A1 | 3/2020 |
| WO | 2021073656 A1 | 4/2021 |

OTHER PUBLICATIONS

U.S. Appl. No. 16/250,823 Final Office Action, dated May 15, 2020, pp. 1-10.
U.S. Appl. No. 16/250,823 Non-Final Office Action dated Oct. 8, 2019.
U.S. Appl. No. 16/127,022 Non-Final Office Action dated Jun. 2, 2020, pp. 1-8.
U.S. Appl. No. 16/127,022 Final Office Action dated Nov. 2, 2020, pp. 1-9.
U.S. Appl. No. 16/127,022 Notice of Allowance, dated Jan. 27, 2021, pp. 1-8.
International Application No. PCT/US2019/050364 International Search Report and Written Opinion dated Dec. 26, 2019. (9 pages).
Takuya Yoda, et al. Dynamic Photometric Stereo Method Using a Mlti-Tap CMOS Image Sensor. 23rd international Conference on Pattern Recognition (ICPR) Dec. 8, 2016. pp. 2356-2361.
Koshiro Moriguchi et al. Time-of-Flight Range Image Sensor Based on Exposure Coding with a Multi-aperture Imaging System. 2016 by ITE transaction on a Media Technology and Applications (MTA), vol. 4, No. 1, 2016. pp. 78-83.
Chinese Application No. 201810066893.8 Office Action dated Oct. 31, 2019.
U.S. Appl. No. 16/250,823 Notice of Allowance dated Mar. 24, 2021, pp. 1-8.
European Patent Office, Extended European Search Report for EP 19859384.0, dated Apr. 4, 2022, 10 pages.
U.S. Appl. No. 17/359,089, Non-Final Office Action dated Feb. 15, 2023, 23 pages.
Chinese Patent Office, Chinese Application No. 201980058923.3, 1st Office Action dated Mar. 16, 2023, 5 pages.
Chinese Patent Office, Chinese Application No. 201980058923.3, Search Report dated Mar. 13, 2023, 3 pages.
European Patent Office, Communication pursuant to Article 94(3) EPC for EP 19859384.0, dated Aug. 4, 2023, 5 pages.
U.S. Patent & Trademark Office, Final Office Action for U.S. Appl. No. 17/359,089, dated Jul. 27, 2023, 30 pages.

(56) References Cited

OTHER PUBLICATIONS

U.S. Patent & Trademark Office, Non-Final Office Action for U.S. Appl. No. 17/361,279, dated Jul. 7, 2023, 11 pages.

* cited by examiner

ADAPTIVE ILLUMINATION FOR A TIME-OF-FLIGHT CAMERA ON A VEHICLE

CROSS-REFERENCE TO RELATED APPLICATIONS

This patent application is a continuation of U.S. application Ser. No. 17/325,135 filed May 19, 2021, which is a continuation of U.S. application Ser. No. 16/127,022, filed Sep. 10, 2018, entitled, "ADAPTIVE ILLUMINATION FOR A TIME-OF-FLIGHT CAMERA ON A VEHICLE,". The entire contents of the above patent applications are incorporated by reference as part of the disclosure of this patent document.

TECHNICAL FIELD

This document relates to image capture and processing.

BACKGROUND

A vehicle can be autonomously controlled to navigate along a path to a destination. Autonomous vehicle control uses sensors to sense the position and movement of the vehicle, and based on data from the sensors, navigates the vehicle in the presence of stationary and moving objects. Autonomous vehicle navigation can have important applications in the transportation of people, goods and services. One aspect of autonomous vehicle control, which ensures the safety of the vehicle and its passengers, as well as people and property in the vicinity of the vehicle, is analysis of images generated by image sensors on the vehicle. The images may be analyzed to determine fixed and moving obstacles in the vehicle's path, or in the vicinity of the vehicle. Improved image capture and analysis are needed to improve autonomous vehicle navigation and control.

SUMMARY

Disclosed are devices, systems and methods for processing an image. In one aspect, an electronic camera apparatus includes an image sensor with a plurality of pixel regions. The apparatus further includes an exposure controller. The exposure controller determines, for each of the plurality of pixel regions in an image, a corresponding exposure duration and a corresponding exposure start time. Each pixel region begins to integrate incident light starting at the corresponding exposure start time and continues to integrate light for the corresponding exposure duration. In some example embodiments, at least two of the corresponding exposure durations or at least two of the corresponding exposure start times are different in the image.

The following features may be included in any combination. The apparatus further includes a plurality of gating circuits, one gating circuit for each of the plurality of pixel regions, wherein each gating circuit begins exposure of one of the plurality of pixel regions at the corresponding exposure start time and continues the exposure for the corresponding exposure duration. Multiple pixel regions correspond to a portion of the image, wherein the portion of the image is of an object at a distance from the image sensor, and wherein each of the multiple pixel regions have the same exposure start time. The image is representative of a plurality of objects at different distances from the image sensor, wherein each object corresponds to a different portion of the image, and wherein each portion of the image is associated with different pixel regions each with a different corresponding exposure start time associated with one of the different distances. A light intensity at each of the plurality of pixel regions determines the corresponding exposure duration. The distance is determined by one or more sensors including a LiDAR sensor, a RADAR sensor, or an ultrasonic sensor. The one or more sensors determine positions of moving objects within a field of view of the camera. The distance is determined from a high-definition map, wherein the high-definition map includes global positioning system coordinates for road lanes and objects within a field of view of the camera. The high-definition map is updated over time as the camera moves or as moving objects change location. The high-definition map is updated by predicting the location of the camera using velocity information about the camera from global positioning system data. The high-definition map is updated by predicting the location of one of the moving objects using velocity information about the moving object determined at least in part from two or more determined positions of the moving object.

In another aspect, a method of generating an image on an electronic camera is disclosed. The method includes receiving, from one or more distance sensors, distances between an image sensor and objects imaged by the image sensor, and associating one or more pixel regions of the image sensor with each of the objects. The method further includes determining, from the received distances and the associations of the one or more pixel regions with the objects, a corresponding exposure start time for each of the pixel regions to begin exposure to incoming light, and determining, for each pixel region, a corresponding exposure duration, wherein each pixel region continues to be exposed to incoming light starting from the exposure start time and continuing for the corresponding exposure duration. At least two of the corresponding exposure durations or at least two of the corresponding exposure start times are different in the image.

In another aspect, the above-described method is embodied in the form of executable code stored in a computer-readable program medium.

In yet another aspect, a device that is configured or operable to perform the above-described method is disclosed. The device may include a processor that is programmed to implement the method.

The above and other aspects and features of the disclosed technology are described in greater detail in the drawings, the description and the claims.

DETAILED DESCRIPTION

Visual perception in self-driving or autonomous vehicles requires high-reliability cameras in various environments such as environments that are backlit, have low lighting, and so on. Because of imbalanced light distribution or an insufficient amount of light, the setting of a global shutter speed for the entire image sensor that is imaging a scene may not be feasible. Consistent with the disclosed subject matter is a time-of-flight (ToF) camera such as a Complementary Metal Oxide Semiconductor (CMOS)/Charge-Coupled Device (CCD) camera where the exposure to light of individual pixels, or regions of pixels, can be controlled to achieve different exposures for the different pixels or regions of the image sensor. Different areas in the resulting image may be generated with different exposure start times and/or exposure durations. The different exposure start times may be determined in part from different distances between the image sensor and the objects in the image determined from a pre-built high-definition (HD) map or distance sensors such as LiDAR, RADAR, or ultrasonic distance sensors. In some example embodiments, a light source such as a flash is initiated. From the known location of the flash and the distances between the flash and the various objects, arrival times at the image sensor for the light from the objects can be determined. Other sensors may determine the light intensity received from the different objects. From the intensities of the light from the various objects, the amount of time the electronic shutter should be open for each pixel region can be determined.

The techniques described in this patent document provide shutter for individual pixels or regions of pixels. The electronic shutter control incorporates information from a high-definition map and/or distance sensors to provide better camera perception in poor lighting conditions thereby improving camera performance in autonomous driving applications.

Figure 1:
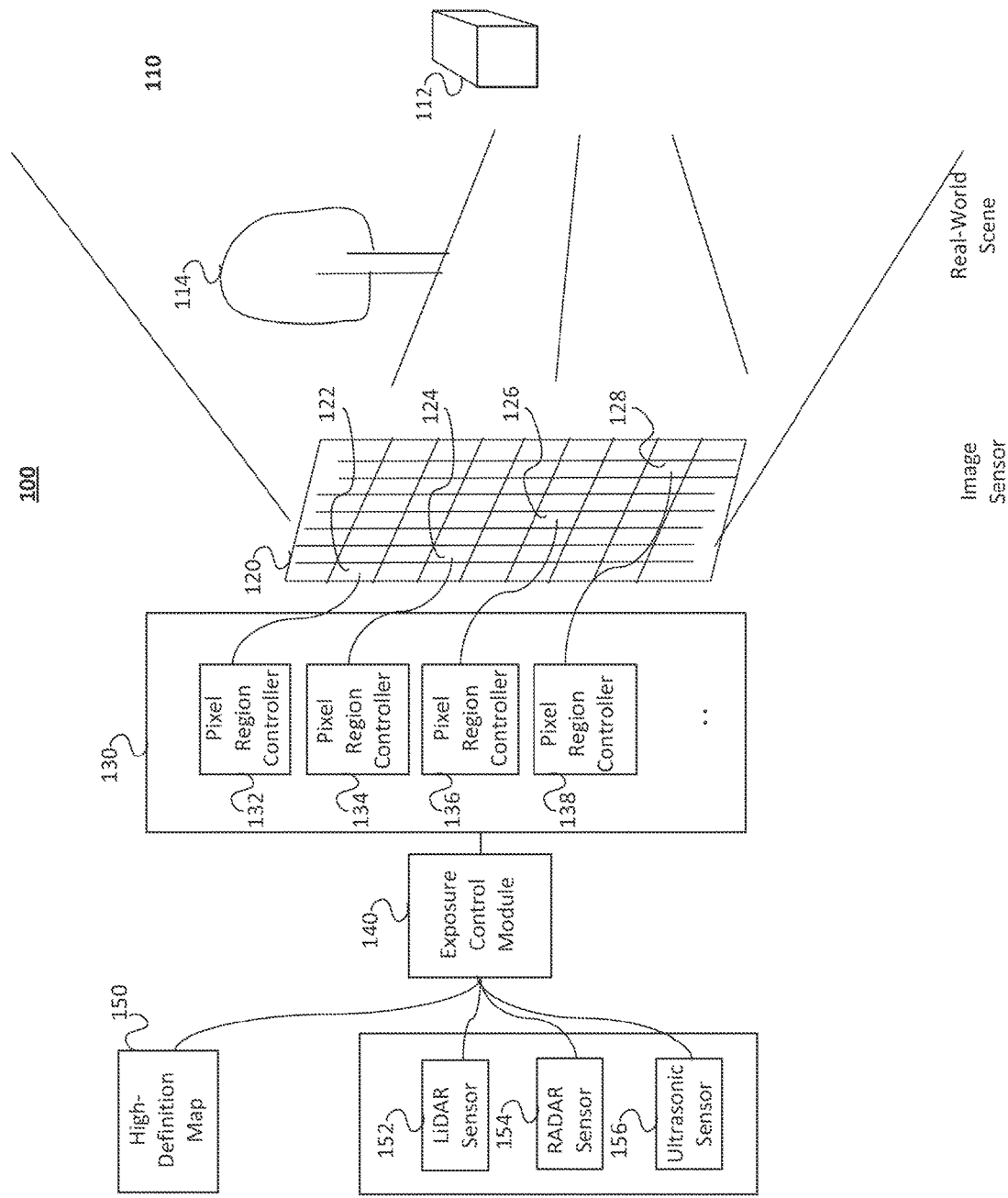
FIG. 1 depicts an example block diagram of a camera system, in accordance with some example embodiments.

FIG. 1 depicts an example block diagram of a camera system 100, in accordance with some example embodiments. Real-world scene 110 is an example view from a camera on an autonomous vehicle looking forward, rearward, or to a side. Image sensor 120 captures an image of the scene 110. Pixel region controller 130 controls the exposures of regions of the image sensor 120. Exposure control module 140 determines the exposure start times and the exposure durations for the various regions of image sensor 120. To determine the exposure start times, exposure control module 140 may receive distance information related to the objects in scene 110 from one or more distance sensors such as RADAR sensor 154, LiDAR sensor 152, ultrasonic sensor 156, and/or high-definition map 150. To determine the exposure durations, exposure control module 140 determines the brightness of the various regions on the image sensor 120.

In the example of scene 110, objects are included such as tree 114 and block 112. Tree 114 is closer to image sensor 120 than is box 112. Other objects may be in scene 110 (not shown) such as roads, buildings, other vehicles, road signs, bicycles, pedestrians, and the like. Some objects may be at the same distance form image sensor 120 and other objects may be at different distances. Some objects may be more brightly illuminated than other objects due to their proximity to a light source, proximity to the image sensor, and/or the reflectivity of the object. Generally closer and/or more reflective objects appear brighter at the image sensor and farther and/or less reflective objects appear less bright at the image sensor.

Image sensor 120 captures an image of the scene 110 including box 112 and tree 114 as well as other objects which are at different distances from image sensor 120. Image sensor 120 may be a two-dimensional array of pixels where each pixel generates an electrical signal related to the light intensity impinging on the pixel. When combined together, the electrical signals corresponding to the individual pixels produce an electrical representation of the image of scene 110. Image sensor 120 may include 1,000, 000 pixels or any other number of pixels. Although not shown, optical components such as lenses, apertures, and/or mechanical shutters may be included in the camera which includes image sensor 120. Image sensor 120 may provide for applying an electronic shutter to individual pixels or regions of pixels. An electronic shutter is an enabling signal, or a gate, that enables a corresponding pixel or pixel region to capture incident light when the electronic shutter is open (or the enabling signal or gate is active) and to not capture incident light when the electronic shutter is closed (or the enabling signal or gate is inactive). Shown at 120 is a two-dimensional array of pixel regions including pixel regions 122, 124, 126, 128, and others. Image sensor 120 may be a charge-coupled device or any other type of image sensor that is electronically gated or shuttered.

Pixel region controller 130 controls the exposure of the pixel regions (or individual pixels) of the image sensor 120. Shown in FIG. 1 is pixel region controller 132 which controls the exposure of pixel region 122, pixel region controller 134 which controls the exposure of pixel region 124, pixel region controller 136 which controls the exposure of pixel region 126, and pixel region controller 138 which controls the exposure of pixel region 128. Controlling the exposure includes control of when the pixel region is exposed to incident light such as an exposure start time control and an exposure duration control. For example, a charge coupled device integrates charge due to the incident light starting at the exposure start time and continues to integrate for the exposure duration.

Exposure control module 140 determines the exposure start times for the various pixel regions of image sensor 120—a time when the exposure starts for each pixel region. Exposure control module 140 may receive distance information related to the objects in scene 110 from one or more sensors such as RADAR sensor 154, LiDAR sensor 152, ultrasonic sensor 156, and/or high-definition map 150 as further detailed below. For example, exposure control module 140 can determine when after a flash is initiated at the camera system 100 that the electronic shutter should open for each pixel region based on the known speed of light, the known distance between the camera sensor 120 and objects imaged at each pixel region. As an illustrative example, tree 114 may be imaged by one or more pixel regions such as pixel region 122. After a light flash (not shown in FIG. 1), the electronic shutter for pixel region 122 can remain closed after the flash until the light from the flash propagates to tree 114, is reflected from tree 114, and propagates back to pixel region 122. The electronic shutter is controlled to open at the time the light arrives at pixel region 122.

Exposure control module 140 may receive distance information related to scene 110 from one or more sensors such as RADAR sensor 154, LiDAR sensor 152, ultrasonic sensor 156 and/or high-definition map 150. As illustrative examples, exposure control module 140 may receive from LiDAR sensor 152 a distance that tree 114 is from image sensor 120; exposure control module 140 may receive from RADAR sensor 154 a distance that box 112 is from image sensor 120; exposure control module 140 may receive from ultrasonic sensor 156 distances that box 112 and tree 114 are from image sensor 120. Exposure control module 140 uses the distance information to determine the exposure start times for the pixel regions of the image sensor 120.

Exposure control module 140 determines an exposure duration for each of the various pixel regions—a length of time that the electronic shutter remains open for each pixel region after opening at each corresponding exposure start time. For example, the electronic shutter corresponding to pixel region 126 may open when light propagates from a flash to tree 112, is reflected, and propagates back to pixel region 126. In this example, the image of box 112 at pixel region 126 may be brighter that the image of tree 114 at pixel region 122. Accordingly, the exposure duration for pixel region 126 may be shorter than the exposure duration for pixel region 122. The brightness may be determined from signal levels of the pixels or pixel regions in a recent previous image. As an illustrative example, when images are taken at 30 frames per second, there are 33 milliseconds between frames and the image seen from an autonomous vehicle changes little in 33 milliseconds. In this case, pixel values in the previous image corresponding to the intensities in the previous image may be used to determine the exposure duration for the same pixel region in a later image. For example, in a first image, a pixel region may be saturated or otherwise negatively affected due to too much light exposure which may be determined using image processing of the values from the pixel region. In this example, on the next image of the same scene, the exposure duration may be reduced to prevent saturation or other negative impacts based on the values in the previous image. Objects that appear brighter at the image sensor 120 can have a shorter exposure duration. The exposure duration for each pixel region may be adjusted on successive images and the exposure duration of each pixel region may be adjusted independently from the other pixel regions. In this way, different pixel regions may have different exposure durations to generate an image that includes the correct exposure for all pixel regions.

Exposure control module 140 may receive distance information from high-definition map 150 which may include a map of known objects in the vicinity of a GPS location provided to the high-definition map 150. The high-definition map 150 may contain detailed information about roads, lanes on the roads, traffic lights, stop signs, buildings, and so on. Using GPS information locating the autonomous vehicle and camera system, the vehicle can be placed in the high-definition map 150. Accordingly, the objects stored in the map at the location of the vehicle can be located relative to the vehicle. Distances to the objects can be determined from the map and the vehicles location. The vehicle's location on the map can be updated as the vehicle moves. In some embodiments, the vehicle's location may be advanced to a later time on the map using a location, velocity, and acceleration information at the location at a starting time. In this way, the location of the vehicle may be determined less frequently and the accuracy of the vehicle location between successive location updates can be improved.

Figure 2:
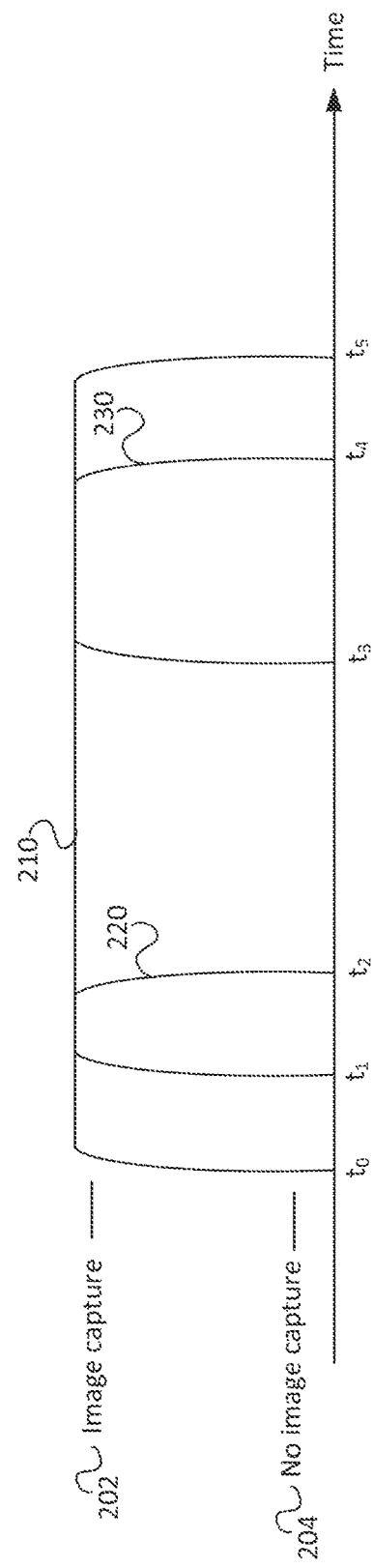
FIG. 2 depicts an illustrative example showing a range of times for electronic shutters for various pixel regions, in accordance with some example embodiments.

FIG. 2 depicts an illustrative example of a diagram 200 showing a range of times for the electronic shutters for various pixel regions, in accordance with some example embodiments. On the horizontal axis is time, and on the vertical axis is a representation of whether an electronic shutter corresponding to a pixel region is open at 202 thereby capturing an image, or closed at 204 thereby not capturing an image. In FIG. 2, time $t_0$ is the earliest time that the electronic shutter of any of the pixel regions may be opened, and time $t_5$ is the latest time that the electronic shutter of any of the pixel regions may close. Between times $t_1$ and $t_2$ is a representation 220 of an electronic shutter control for one or more pixel regions. The electronic shutter opens at a shutter time $t_1$ and closes at $t_2$. Accordingly, in this example, $t_1$ is the exposure start time and the exposure duration is $t_2$-$t_1$. Representation 220 corresponds to an object closer to the image sensor than the object corresponding to representation 230. Between times $t_3$ and $t_4$ is a representation 230 of another electronic shutter control for one or more pixel regions. The electronic shutter at 230 opens at a shutter start time $t_3$ and closes at $t_4$. Accordingly, in this example, the exposure duration is $t_4$-$t_3$. FIG. 2 depicts two different electronic shutter control representations, but any number of different shutter controls may be used depending on the number of objects and their distances from the image sensor. In some example embodiments one or more pixel regions may have their electronic shutters open more than once in an image corresponding to more than one object being imaged by the same pixel region(s) where the objects are at different distances, or the distance to one object is unknown but one of several values. The exposure duration $t_4$-$t_3$ is greater that the exposure duration $t_2$-$t_1$ corresponding to the image at the pixel region(s) associated with 230 being darker and thus requiring more image capture (or integration) time than the pixel regions associated with 220.

Figure 3:
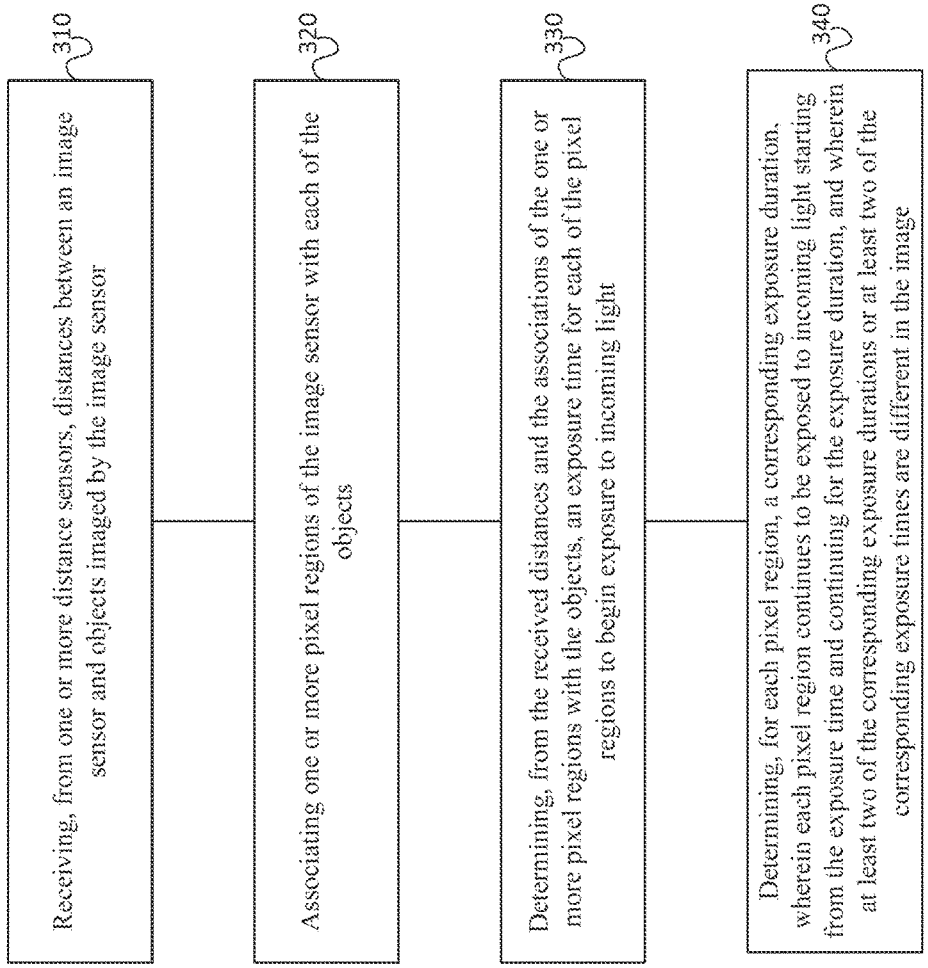
FIG. 3 depicts a process, in accordance with some example embodiments.

FIG. 3 depicts a process, in accordance with some example embodiments. At 310, the process includes receiving distances between an image sensor and objects imaged by the image sensor. At 320, the process includes associating one or more pixel regions of the image sensor with each of the objects. At 330, the process includes determining, from the received distances and the associations, an exposure start time for each of the pixel regions to begin exposure to incoming light. At 340, the process includes determining, for each pixel region, a corresponding exposure duration, wherein each pixel region continues to be exposed to incoming light starting from the exposure start time and continuing for the exposure duration.

At 310, the process includes receiving distances from one or more distance sensors between an image sensor and objects imaged by the image sensor. For example, a LiDAR distance sensor may determine a first distance between the image sensor and a first object. An ultrasonic distance sensor may determine a second distance. A RADAR distance sensor may determine a third distance and/or may provide another distance measurement to an object whose distance is also determined by another distance sensor. In some example embodiments, the distance may be determined to a fixed object associated with the image sensor and the distance may be corrected by the fixed offset distance.

At 320, the process includes associating one or more pixel regions of the image sensor with each of the objects. As an illustrative example, an image sensor may have 100,000 pixel regions, each region including 100 pixels for a total of 10,000,000 pixels in the image sensor. In this example, a car is imaged on the image sensor. The image of the car occupies 1,000 pixel regions which are associated with the car object. The car is a distance from the image sensor that is determined by one or more distance sensors. Other objects may be imaged on the image sensor occupying a number of different pixel regions dependent on the size of the object and its proximity to the image sensor. Associated with the other objects that are various distances from the image sensor that are determined by the one or more distance sensors.

At 330, the process includes determining an exposure start time for each of the pixel regions based on the distances to the objects and the associations of the one or more pixel regions with the objects. The exposure start time is an amount of time after an illumination event such as a flash when the light reflected from an object arrives at the image sensor. Continuing the example above, one or more of the distance sensors may determine that the car is 100 feet from the camera. As such, the time of flight for light generated by a flash at the camera is twice the one-way time-of-flight. In this example, if the time of flight is 1 ns per foot, then 200 ns after the flash, light would arrive at the camera due to the flash. Accordingly, the exposure start time would be set to 200 ns after the flash for the 1000 pixel regions associated with the car. Because a car has a complex shape and an orientation relative to the camera and image sensor, some pixel regions may have different exposure start times according to the different distances. Pixel regions associated with other objects may have different exposure start times due to their different distances from the camera.

At 340, the process includes determining a corresponding exposure duration for each pixel region. The exposure duration is the amount of time after the exposure start time, which starts the capture of an image, that the image capture continues. For example, an exposure duration is the amount of time that a charge-coupled device camera sensor integrates charge due to incident light. Each pixel region continues to be exposed to incoming light starting from its corresponding exposure start time and continues for its corresponding exposure duration. The exposure duration may be different for pixel regions whose images have different light intensities. For example, pixel regions corresponding to bright areas of an image have shorter exposure durations than pixel regions corresponding to less bright areas. In this way, different pixel regions have different exposure durations according to the brightness of the associated image areas thereby preventing under exposed image areas and over exposed image areas. In some example images, at least two of the corresponding exposure durations or at least two of the corresponding exposure start times are different in the image.

Figure 4:
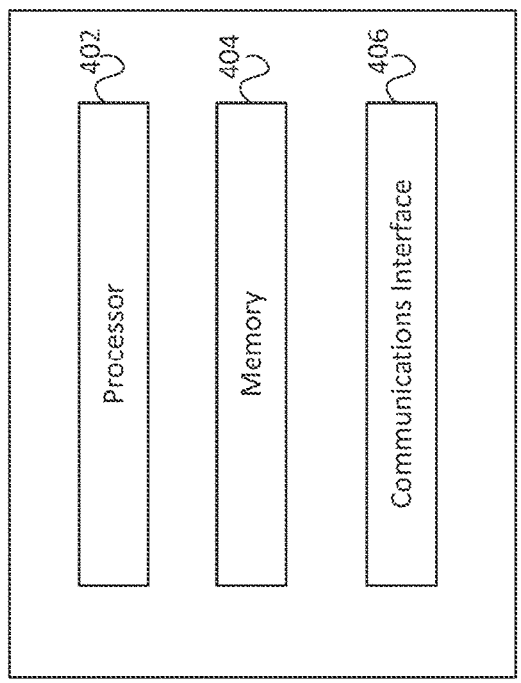
FIG. 4 depicts an example of an apparatus that can be used to implement some of the techniques described in the present document, in accordance with some example embodiments.

FIG. 4 depicts an example of an apparatus 400 that can be used to implement some of the techniques described in the present document. For example, the hardware platform 400 may implement the process 300 or may implement the various modules described herein. The hardware platform 400 may include a processor 402 that can execute code to implement a method. The hardware platform 400 may include a memory 404 that may be used to store processor-executable code and/or store data. The hardware platform 400 may further include a communication interface 406. For example, the communication interface 406 may implement one or more communication protocols (LTE, Wi-Fi, Bluetooth, and so on).

Implementations of the subject matter and the functional operations described in this patent document can be implemented in various systems, semiconductor devices, camera devices, digital electronic circuitry, or in computer software, firmware, or hardware, including the structures disclosed in this specification and their structural equivalents, or in combinations of one or more of them. Implementations of aspects of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of generating an image using an electronic camera, comprising:
    determining, for each object in one or more objects imaged by an image sensor of the electronic camera, a distance between the object and the image sensor using a distance sensor;
    associating, for each object in the one or more objects, one or more pixel regions of the image sensor with the object;
    determining, for each pixel region, a start time for an exposure of the pixel region using the distance determined for the object associated with the pixel region and an exposure duration, wherein the start time corresponds to a time of flight of light from a light source to the object and back from the object to the pixel region; and
    gating, for each pixel region associated with the object, the exposure of the pixel region at the start time and continuing the exposure for the exposure duration.

2. The method of claim 1, further comprising:
    associating a first pixel region with a first object in the one or more objects and associating the first pixel region with a second object in the one or more objects; and
    determining a first start time using a first distance determined for the first object and determining a second start time using a second distance determined for the second object, wherein the first distance is different from the second distance.

3. The method of claim 2, further comprising:
    gating the first pixel region using a gating circuit associated with the first pixel region such that the gating circuit begins exposure of the first pixel region at the first start time, continues the exposure for a first exposure duration, begins exposure of the first pixel region again at the second start time, and continues the exposure for a second exposure duration thereby obtaining a single image of the first object and the second object.

4. The method of claim 1, further comprising:
    activating a light source to illuminate the one or more objects.

5. The method of claim 1, wherein, for a current image, the exposure duration determined for a first pixel region associated with the object is determined using one or more images obtained before the current image.

6. The method of claim 1, wherein the exposure duration for a first pixel region associated with the object is determined using a light intensity.

7. A non-transitory computer readable storage medium encoded with executable instructions for operating an image sensor that, when executed by at least one processor, cause the at least one processor to perform operations, comprising:
    determining, for an object imaged by the image sensor, a distance between the object and the image sensor using a distance sensor;
    associating, for the object, a pixel region of the image sensor with the object;
    determining, for the pixel region associated with the object, a start time for exposure of the pixel region to light incoming to the pixel region using the distance, wherein the start time corresponds to a time of flight of light from a light source to the object and back from the object to the pixel region; and
    gating the pixel region associated with the object using a gating circuit associated with the pixel region, wherein the gating circuit is configured to expose the pixel region.

8. The non-transitory computer readable storage medium of claim 7, wherein the gating circuit is configured to expose the pixel region by beginning an exposure of the pixel region at the start time and continuing the exposure for an exposure duration.

9. The non-transitory computer readable storage medium of claim 7, wherein the gating circuit is configured to expose the pixel region by beginning an exposure of the pixel region at the start time and ending the exposure at an exposure end time.

10. The non-transitory computer readable storage medium of claim 7, wherein the executable instructions cause the at least one processor to perform operations, comprising:
    associating a first pixel region with a first object and associating the first pixel region with a second object; and
    determining a first exposure start time using a first distance determined for the first object and determining a second exposure start time using a second distance determined for the second object, wherein the first distance is different from the second distance.

11. The non-transitory computer readable storage medium of claim 10, wherein the executable instructions cause the at least one processor to perform operations, comprising:
    gating the first pixel region using the gating circuit associated with the first pixel region such that the gating circuit begins exposure of the first pixel region at the first exposure start time, continuing the exposure for a first exposure duration, beginning exposure of the first pixel region again at the second exposure start time, and continuing the exposure for a second exposure duration during thereby obtaining a single image of the first object and the second object.

12. The non-transitory computer readable storage medium of claim 7, wherein the executable instructions cause the at least one processor to perform operations, comprising:
    activating a light source to illuminate a scene including the object.

13. An electronic camera apparatus, comprising:
    an image sensor with a plurality of pixel regions;
    an exposure controller performed on one or more processors and configured to control, for each pixel region in the plurality of pixel regions, an exposure of the pixel region; and
    a plurality of gating circuits, wherein each gating circuit is configured to gate a pixel region in the plurality of pixel regions to begin exposure of the pixel region at an exposure start time, and continue the exposure for an exposure duration or end the exposure at an exposure end time,
    wherein each pixel region is configured to begin collecting incoming light starting at a corresponding exposure start time and continue collecting the incoming light during the corresponding exposure, wherein the corresponding exposure start time corresponds to a time of flight of the incoming light from a light source to an object associated with the pixel region and back from the object to the pixel region, and wherein the exposure start time for a pixel region in the plurality of pixel regions is determined using a distance between the image sensor and an object imaged by the pixel region.

14. The apparatus of claim 13, wherein, for a first pixel region in the plurality of pixel regions, the exposure controller is configured to determine a first exposure start time using a first distance between the image sensor and a first object imaged by the first pixel region and determine a second exposure start time using a second distance between the image sensor and a second object imaged by the first pixel region, wherein the first distance is different from the second distance.

15. The apparatus of claim 14, wherein a gating circuit in the plurality of gating circuits is configured to begin exposure of the first pixel region at the first exposure start time, continue the exposure for a first exposure duration, begin exposure of the first pixel region again at the second exposure start time, and continue the exposure for a second exposure duration during obtaining a single image using the image sensor.

16. The apparatus of claim 13, wherein, for an object imaged in a single image by several pixel regions in the plurality of pixel regions, not all pixel regions in the several pixel regions have a same corresponding exposure start time.

17. The apparatus of claim 13, wherein the exposure duration corresponding to a pixel region in the plurality of pixel regions is determined using a light intensity at the pixel region.

18. The apparatus of claim 13, wherein the distance is determined using at least one of:
a LiDAR sensor,
a RADAR sensor, or
an ultrasonic sensor.

* * * * *